Sept. 8, 1964  S. SASLOW  3,148,090
SALT WATER BATTERY
Filed Feb. 5, 1962  2 Sheets-Sheet 1

*INVENTOR.*
SEYMOUR SASLOW
BY *George B. Onyerolk*
ATTORNEY

Sept. 8, 1964 S. SASLOW 3,148,090
SALT WATER BATTERY
Filed Feb. 5, 1962 2 Sheets-Sheet 2

INVENTOR.
SEYMOUR SASLOW
BY George B. Oujwock
ATTORNEY 3,148,090
SALT WATER BATTERY
Seymour Saslow, Saratoga Springs, N.Y., assignor to Espey Mfg. & Electronics Corp., Saratoga Springs, N.Y. a corporation of New York
Filed Feb. 5, 1962, Ser. No. 170,917
7 Claims. (Cl. 136—100)

This invention relates to batteries, and more particularly to a battery in which the electrolyte is salt water.

Batteries using salt water as an electrolyte have found extensive use in connection with anti-submarine warfare. These batteries heretofore were built by hand in a very crude fashion. Silver chloride and magnesium foil were used as the battery cell plates and the foil sheets were taped together to seal them. Thin plastic separators kept the foil sheets of each cell apart. These batteries of the prior art were very inefficient and lasted only for two hours.

The battery of the present invention provides an improved construction which is much easier to assemble, and because of its improved construction it will last 50% longer than the batteries of the prior art.

Briefly, the salt water battery of the present invention comprises rigid polystyrene sheets, to which sheets of magnesium and silver chloride are fixed by means of rivets to make up the cells of the battery. The plates of each cell are separated by rigid polystyrene separators. The rivets mounting the magnesium and silver chloride sheets on the plastic sheets electrically connect the cells of the battery together and connect the output terminals of the battery to the cells. The cells are so constructed that the impurities formed in the cells will not remain there, but will be washed out by gravity.

Accordingly, a principal object of the present invention is to provide an improved salt water battery.

Another object of this invention is to increase the life of salt water batteries.

A further object of this invention is to provide a salt water battery which is easy to assemble.

A still further object of this invention is to improve the construction of salt water batteries.

Further objects and advantages of the present invention will become readily apparent as the following detailed description of a specific embodiment of the invention unfolds, and when taken in conjunction with the accompanying drawings, wherein.

Figure 1:
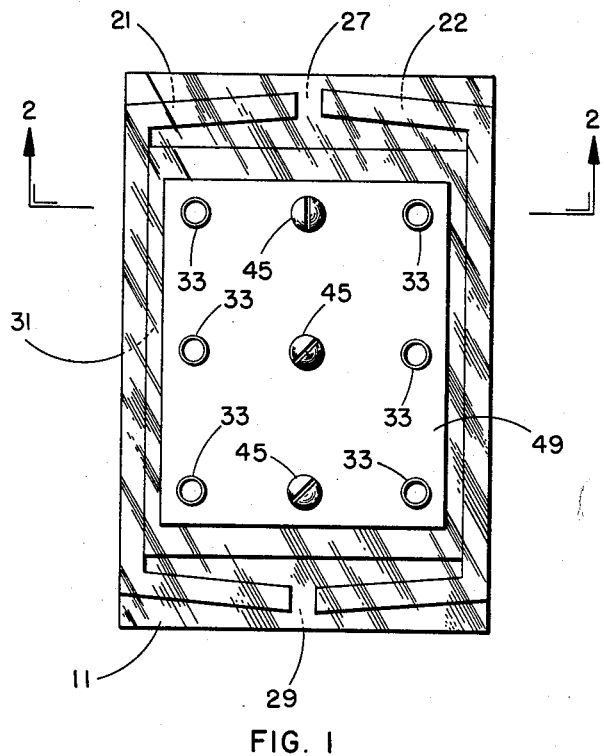
FIG. 1 is a general view of the battery of the present invention.
Figure 2:
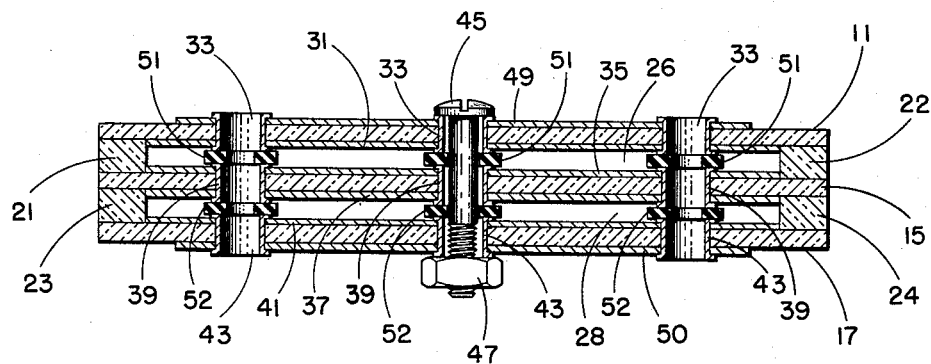
FIG. 2 is a sectional view of the battery shown in FIG. 1 taken along the lines 2—2.
Figure 3:
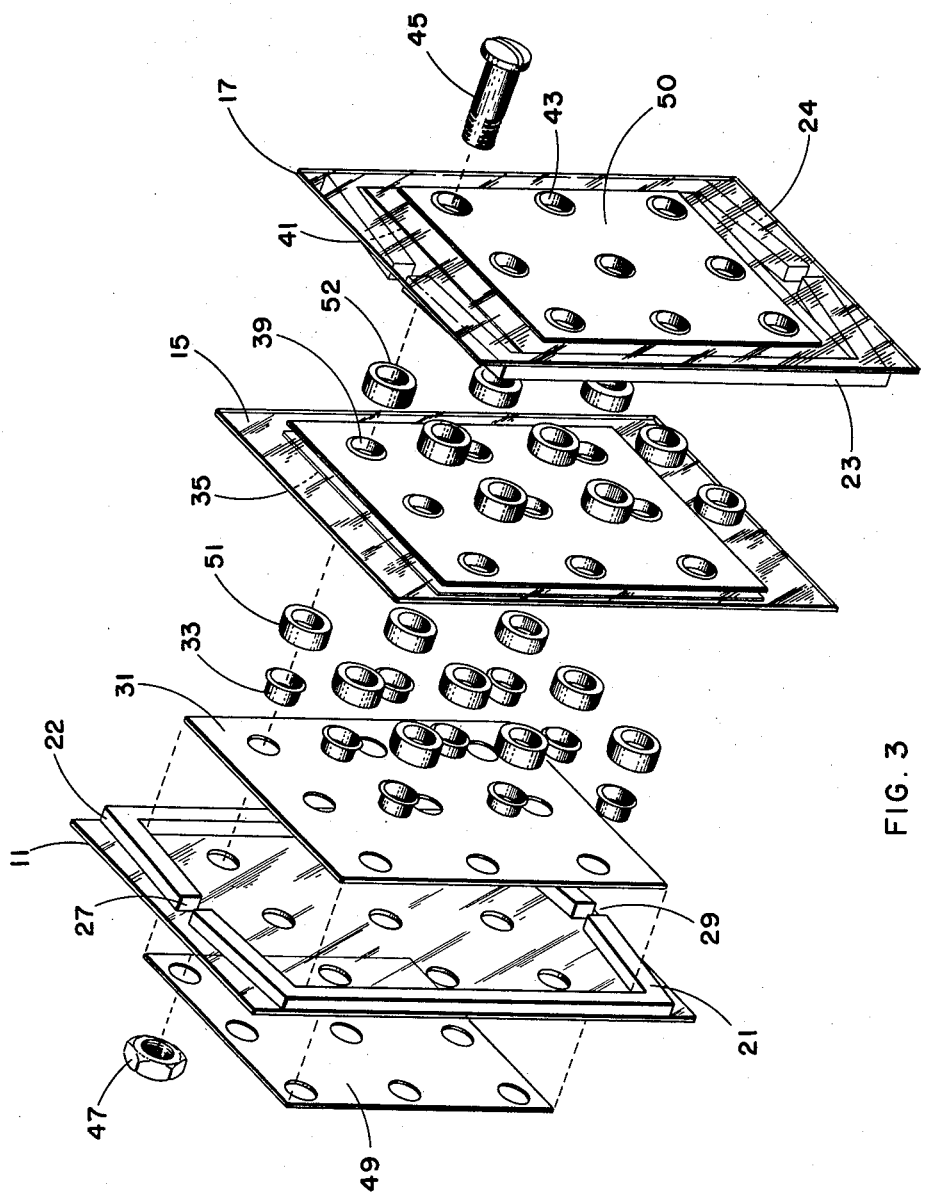
FIG. 3 is an exploded view of the battery.

As shown in the drawings, the battery comprises three one-eighth inch rigid sheets 11, 15 and 17, which in the preferred embodiment are polystyrene. These polystyrene sheets are separated by one-fourth inch thick polystyrene members 21 through 24, thus leaving a cavity 26 between the sheets 11 and 15 and a cavity 28 between the sheets 15 and 17. The members 21 and 22, which separate the sheets 11 and 15, are visible in FIG. 1 since polystyrene is transparent. As shown in FIG. 1, the members 21 and 22 are generally U-shaped and extend around the periphery of the sheets 11 and 15. The ends of the members 21 and 22 are spaced slightly apart to leave openings 27 and 29 so that salt water can freely enter into the cavity 26 between the sheets 11 and 15. The members 23 and 24 separating sheets 15 and 17 are shaped identically to the members 21 and 22 to provide openings to the cavity 28 between the sheets 15 and 17. A magnesium sheet 31 is riveted to the side of the polystyrene sheet 11 within the cavity 26 by means of electrically conducting rivets 33. A silver chloride sheet 35 is riveted to the side of the sheet 15 within the cavity 26 and a magnesium sheet 37 is riveted to the side of the sheet 15 within the cavity 28 by means of electrically conducting rivets 39. The rivets 39 electrically connect the silver chloride sheet 35 and the magnesium sheet 37 together. A silver chloride sheet 41 is riveted to the side of the polystyrene sheet 17 within the cavity 28 by means of electrically conducting rivets 43. Thus the magnesium sheet 31 and the silver chloride sheet 35 face each other in the cavity 26 and the magnesium sheet 37 and the silver chloride sheet 41 face each other in the cavity 28. The polystyrene members 21 and 22 separate the sheets 11 and 15 sufficiently that the sheets 31 and 35 as well as the rivets 33 and 39 are well separated. Similarly the polystyrene members 23 and 24 separate the sheets 15 and 17 sufficiently that the sheets 37 and 41 as well as the rivets 39 and 43 are well separated. The rivets 33, 39 and 43 define holes through the sheets 11, 15 and 17 and the sheets 31, 35, 37 and 41. The assembly of the sheets 11, 15 and 17 with the spacers 21 through 24 and the magnesium and silver chloride sheets riveted to the sheets 11, 15 and 17 are bolted together by means of nylon bolts 45 which pass through the entire assembly through holes defined by the rivets 33, 39 and 43. A nylon nut 47 secures each bolt 45 holding the assembly together.

When the cavities 26 and 28 between the sheets 11, 15 and 17 are filled with salt water, the device becomes a two-cell battery with the salt water acting as the electrolyte, the magnesium sheet 31 and the silver chloride sheet 35 acting as one cell of the battery and the magnesium sheet 37 and the silver chloride sheet 41 acting as the other cell of the battery. An electrical connector 49 is connected to one of the rivets 33 to provide one output terminal of the battery and a similar electrical connector is connected to one of the rivets 43 on the outer side of the sheet 17 to provide the other output terminal of the battery. When the battery is in use the unit will be immersed in salt water so that the salt water enters into the cavities 26 and 28 to activate the cells. The unit will be attached to a piece of equipment such as a piece of anti-submarine warfare equipment so that one of the openings 27 or 29 and the corresponding opening to the cavity 28 will be facing downward. With this orientation the impurities formed within the cavities 26 and 28 will be washed out by gravity.

The battery may be easily expanded to provide as many cells as desired simply by using between the end sheet members 11 and 17 additional sheets such as the sheet 15 with a silver chloride sheet riveted on one side and a magnesium sheet riveted on the other side. Also the assembly may be held together by other means instead of the nylon nuts and bolts 47 and 45. For example, the sheets 11, 15 and 17 and the separating members 21 through 24 may be bound together by heat sealing to hold the assembly together. These and many other modifications may be made to the above described specific embodiment of the invention without departing from the spirit and scope of the invention, which is defined in the appended claims.

What is claimed is:

1. A battery which becomes activated when filled with salt water comprising a first rigid sheet of insulating material, a second rigid sheet of insulating material spaced from said first sheet of insulating material defining a first cavity therebetween, a third rigid sheet of insulating material spaced from said first sheet of insulating material on the opposite side thereof from said second sheet of insulating material and defining a second cavity between said third sheet of insulating material and said first sheet of insulating material, a first pair of generally U-shaped rigid separating members of insulating material between said first and second sheets extending along the sides of said first and second sheets with the open ends of said U-shaped members facing each other, the ends being spaced slightly apart leaving openings opposite each other to said first cavity and maintaining said first and second sheets separated in spaced relation, a second pair of generally U-shaped rigid separating members of insulating material between said first and third sheets extending along the sides of said first and third sheets disposed like said first pair of generally U-shaped members leaving openings opposite each other to said second cavity in the same relative position as said openings to said first cavity and maintaining said first and third sheets of insulating material separated in spaced relation, a first sheet of anode material within said first cavity fixed against the side of said first sheet of insulating material, a first sheet of cathode material within said first cavity fixed against the side of said second sheet of insulating material, a second sheet of said cathode material within said second cavity fixed against the side of said first sheet of insulating material, a second sheet of said anode material within said second cavity fixed against the side of said third sheet of insulating material, said anode and cathode materials being of types that generate voltage therebetween when interconnected by salt water, and electrically conducting means connecting said first sheet of said anode material and said second sheet of said cathode material through said first sheet of insulating material.

2. A battery as recited in claim 1 wherein said anode material is magnesium and said cathode material is silver chloride.

3. A battery as recited in claim 1 wherein said insulating material is polystyrene.

4. A battery as recited in claim 1 wherein said electrically conducting means is a rivet passing through said first sheet of anode material, said first sheet of insulating material and said second sheet of cathode material.

5. A battery as recited in claim 1 wherein said first and second pairs of generally U-shaped separating members are about one-quarter inch thick.

6. A battery as recited in claim 1 wherein said rigid sheets of insulating members and said sheets of anode and cathode material are held together by a nylon nut and bolt.

7. A battery as recited in claim 1 wherein said sheets of insulating material and said pairs of generally U-shaped separating members are bound together by heat sealing to hold the assembly together.

References Cited in the file of this patent

UNITED STATES PATENTS

| | | |
|---|---|---|
| 701,253 | Bennet | May 27, 1902 |
| 2,564,495 | Mullen | Aug. 14, 1951 |
| 2,590,584 | Taylor | Mar. 25, 1952 |
| 2,968,688 | Skinner | Jan. 17, 1961 |
| 2,988,587 | Haring | June 13, 1961 |
| 3,005,864 | Sharpe | Oct. 24, 1961 |